Sept. 11, 1973  KIMIKAZU AZUMA  3,758,359
METHOD OF MANUFACTURING FOAMED PLASTIC TUBULAR NETS
Filed March 30, 1971  5 Sheets-Sheet 4

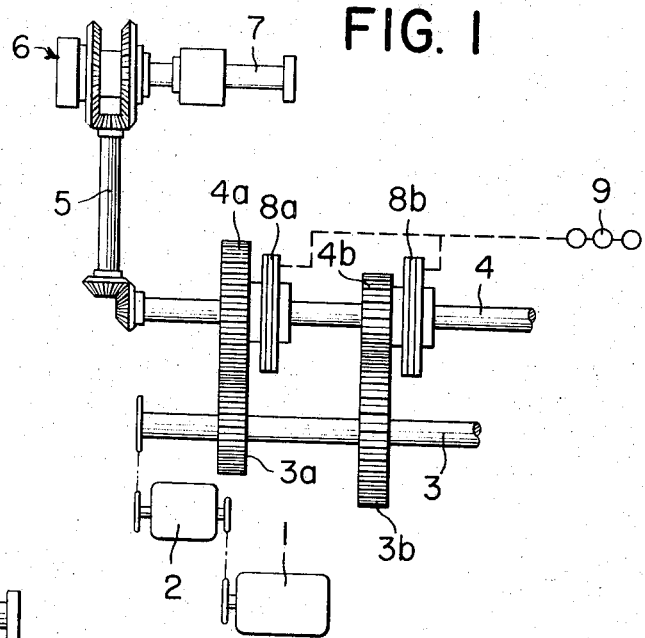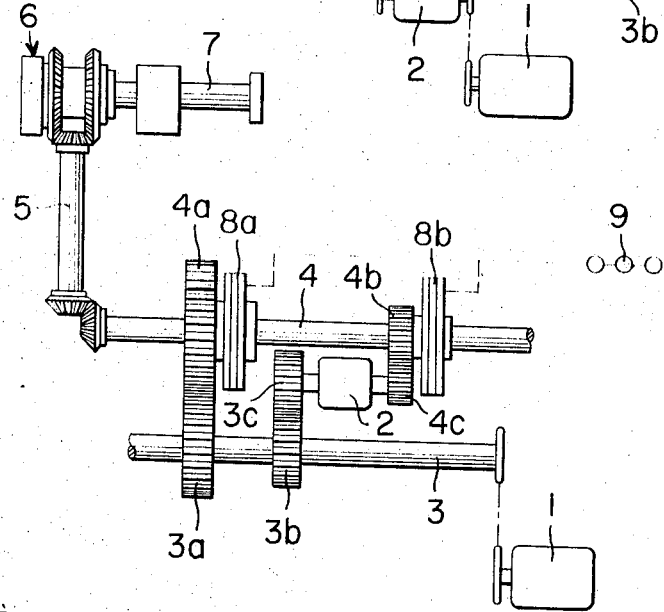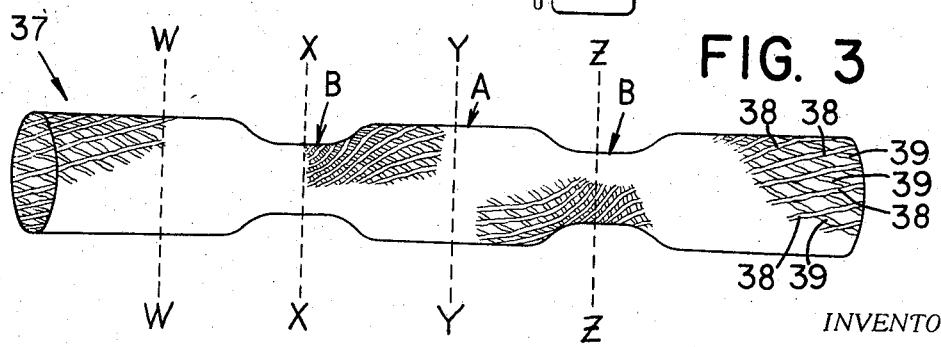

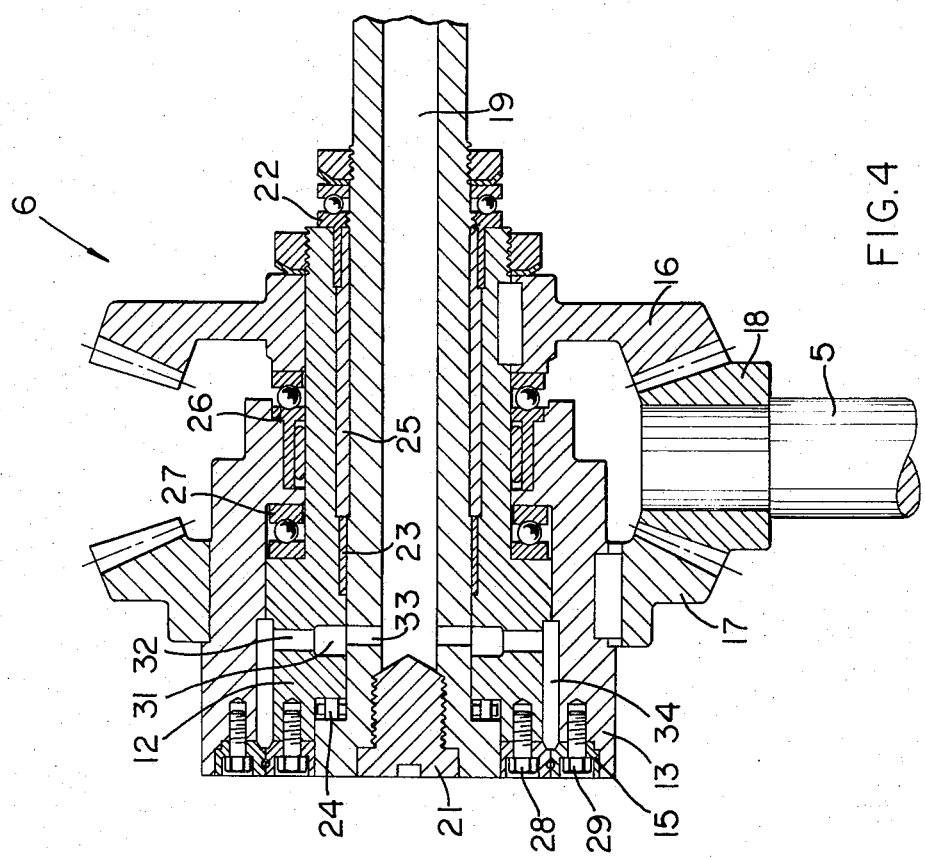
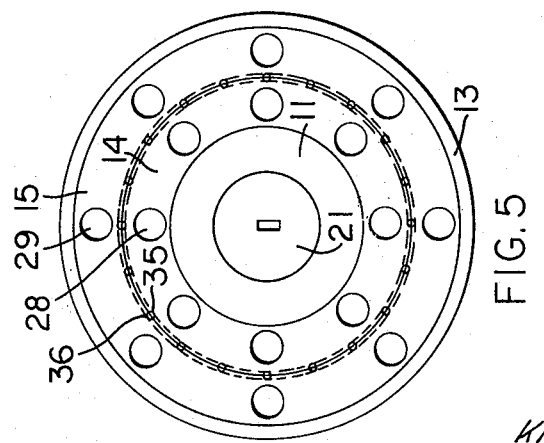

INVENTOR
KIMIKAZU AZUMA
BY Woodhams, Blanchard & Flynn
ATTORNEYS

Sept. 11, 1973  KIMIKAZU AZUMA  3,758,359
METHOD OF MANUFACTURING FOAMED PLASTIC TUBULAR NETS
Filed March 30, 1971  5 Sheets-Sheet 5

INVENTOR
KIMIKAZU AZUMA
BY Woodhams, Blanchard & Flynn
ATTORNEYS

United States Patent Office 3,758,359
Patented Sept. 11, 1973

3,758,359
METHOD OF MANUFACTURING FOAMED
PLASTIC TUBULAR NETS
Kimikazu Azuma, 3–18 Matsugaoka 3-chome Kugenuma,
Fujisawa-shi, Kanagawa-ken, Japan
Filed Mar. 30, 1971, Ser. No. 129,445
Claims priority, application Japan, Apr. 2, 1970,
45/28,086, 45/28,087
Int. Cl. B29h 9/02
U.S. Cl. 156—244                                    3 Claims

ABSTRACT OF THE DISCLOSURE

A tubular network structure in which the size, spacing and/or orientation of the strands is changed at regular intervals along the lengthwise direction thereof. The strands of the network structure are made of foamed plastic. The network structure can be made into a protective cover or sleeve for objects. The network structure is made by extruding a foamable plastic through an annular rotary head die comprising a pair of rotary members which are rotatable relative to each other in a direction transverse to the direction of extrusion. The relative rate of rotation of the rotary members is changed at regular intervals to change the size, spacing and/or orientation of the strands so that the pattern of the network structure changes at regular intervals along the length thereof.

BACKGROUND OF THE INVENTION

Field of the invention

The present invention relates to a method of manufacturing a foamed-plastic tubular network structure provided at regular, axially spaced intervals with portions having a different network pattern, as well as diameter. The invention also relates to an apparatus for performing said method. Moreover, the invention also relates to products of said method.

Description of the prior art

The method of manufacturing a continuous tubular net, in which the strands consist of a foamed plastic, by the process of extruding a foamable molten plastic material using an annular rotary head die comprising an inner rotary member and an outer rotary member which are capble of moving relative to each other in a direction transverse to the direction of extrusion and are provided with a plurality of slots along the confronting surfaces of them, is well known. This method is capable of producing a tabular net having a uniform shape and network pattern throughout its entire length. It is possible to modify the network pattern of said tubular net in its entirety by controlling the speed of the die as well as the amount of the plastic material extruded therefrom, but it is not possible to change the network pattern and diameter of the tubular net only in selected axially spaced zones. Consequently, the product resulting therefrom is only applicable to uses wherein it is acceptable to employ a tubular net having a uniform diameter.

SUMMARY OF THE INVENTION

The present invention relates to a method and an apparatus for manufacturing a foamed-plastic, tubular net which has a different network pattern and diameter in spaced zones along the lengthwise direction thereof. The resulting tubular net product is capable of resilient expansion and contraction in the radial direction so that it can be effectively utilized as a packing material for globular fruits and the like, and can be used as the buffer means for cylindrical articles.

The present invention is characterized by a method of manufacturing a continuous foamed plastic tubular net by extruding a foamable molten plastic material through an annular rotary head die comprising a pair of rotary members capable of moving relative to each other in a direction transverse to the direction of extrusion, wherein the speed of the relative movement of said rotary members is changed at regular intervals between a low relative speed and a high relative speed to thereby form a tubular net product which has portions having a different network pattern and diameter at regular intervals along the lengthwise extent of said tubular net.

BRIEF DESCRIPTION OF THE DRAWINGS

FIG. 1 is a schematic representation of an apparatus constructed according to the present invention for producing a foamed plastic tubular net.

FIG. 2 is a schematic representation of a modified apparatus according to the present invention.

FIG. 3 is an oblique view of a foamed tubular net produced utilizing the apparatus of tne present invention.

FIG. 4 is a vertical, central, sectional view of the die assembly used for extruding the foamed tubular net.

FIG. 5 is an end view of the die illustrated in FIG. 4.

DETAILED DESCRIPTION

Figure 9:
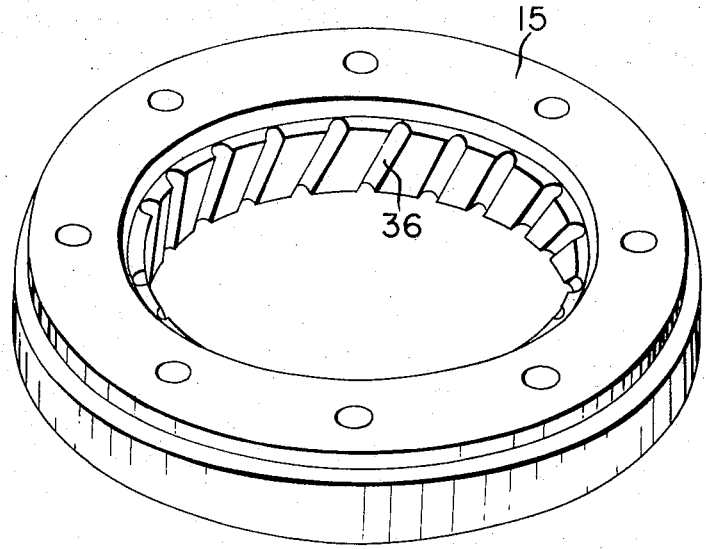
FIG. 9 is a perspective view of the outer die member.

Referring to FIG. 1, 1 denotes a motor with a non-step change gear, 2 denotes a variable speed gear mechanism driven by said motor, 3 denotes a first driving shaft operated by said variable speed gear mechanism 2, 4 denotes a second driving shaft drivingly coupled with the first shaft 3, 5 denotes a driving shaft for driving a die assembly 6 coupled therewith, and 7 denotes an extruder for supplying molten foamable plastic to said die assembly 6. A gear 3a is mounted on the first driving shaft 3 for rotation therewith for the purpose of effecting low-speed driving of shaft 5 and a gear 3b also is mounted on shaft 3 for the purpose of effecting high-speed driving of shaft 5. A low-speed gear 4a and a high-speed gear 4b respectively engage the foregoing gears 3a and 3b and are rotatably mounted on the second driving shaft 4. The second driving shaft 4 is provided with electromagnetic clutches 8a and 8b capable of clutching the low-speed gear 4a and the high-speed gear 4b, alternatively, to said shaft 4. These electromagnetic clutches 8a and 8b are operated in sequence and in timed relation by a conventional timer 9.

In the foregoing apparatus rotation of the first driving shaft 3 by the variable speed gear mechanism 2 and the motor 1, causes the second driving shaft 4 to rotate. The electromagnetic clutches 8a and 8b alternately connect and disconnect the gears 4a and 4b to the shaft 4 by the function of the time switch of the timer 9. By virtue of this operation, the second driving shaft 4 is continuously and alternately rotated at a low speed and at a high speed and this rotation is transmitted to the driving shaft 5. Said shaft 5 transmits the rotation to the rotary die assembly 6 which funcions to control the extrusion of the foamable molten plastic material from the extruder 7 into the air.

During the time when the electromagnetic clutch 8a clutches the low-speed gear 4a to the shaft 4, the electromagnetic clutch 8b is disconnected to permit free rotation of the high-speed gear 4b, whereby the foamed plastic tubular net of a distinctive pattern corresponding to the low-speed operation is extruded from the die assembly 6. During the time when the electromagnetic clutch 8b clutches the high-speed gear 4b to the shaft 4, by virtue of an operation reverse to the foregoing, the die assembly 6 operates at high-speed and the foamed plastic tubular net as formed has a smaller diameter and a different network pattern from that of the low speed operation. Consequently, there is continuously obtained a product in the form of a tubular net 37 consisting of portions different in network pattern and diameter and formed alternately at regular intervals along the lengthwise direction. FIG. 3 shows an example of this product, wherein A represents the portion extruded at a lower die speed and B represents the portion extruded at a higher die speed.

It will be noted that the helical strands in the section B of the tubular net product are of smaller cross-section, are more closely spaced and have a shorter pitch, i.e. their angle of slope with respect to the longitudinal axis of the net is less, as compared with the strands in section A. As a consequence, section B shrinks diametrically to a greater extent upon solidification of the foamed resin, whereby the diameter of section B is smaller than the diameter of section A.

FIG. 2 is a schematic representation of a modified apparatus according to the present invention, wherein the variable speed gear mechanism 2 is disposed between the high-speed driving gear 3b and the high-speed driving gear 4b to work through the medium of the idle gears 3c and 4c, thereby permitting only the high-speed to be varied.

Considering now the die assembly 6 illustrated in FIGS. 4–9, 11 denotes the die holder, 12 denotes the inner rotary member, 13 denotes the outer rotary member, 14 denotes the inner die member and 15 denotes the outer die member. Further, 16 denotes the bevel gear which is nonrotatably connected to the inner rotary member 12, 17 denotes the bevel gear which is nonrotatably connected to the outer rotary member 13, and 18 denotes the bevel pinion for driving said rotary members from the shaft 5.

The die holder 11 has an internal feed passage 19 into which the molten resin to be extruded is introduced from the extruder 7. The die holder 11 is fixed on the end of the extruder 7, which extruder is of conventional construction, such as disclosed in Pats. Nos. 2,669,751, 2,836,851, 3,160,688, 3,368,008 and 3,374,300. The feed passage 19 is closed by a plug 21 at the end of the die holder 11. The inner rotary member 12 encircles the die holder 11 with the bearings 22, 23 and 24 and the spacer 25 being disposed therebetween to ensure smooth rotation of said inner rotary member. The outer rotary member 13 encircles the inner rotary member 12 with the bearings 26 and 27 being disposed therebetween to ensure smooth rotation of the outer rotary member with respect to the inner rotary member. The inner die member 14 is mounted on the end of the inner rotary member 12 by means of bolts 28 and the outer die member 15 is mounted on the end of the outer rotary member 13 by means of bolts 29.

The interior of the inner rotary member 12 is provided with a distribution chamber 31 comprising an annular groove for feeding the molten resin and a plurality of distribution channels 32 which extend radially outwardly from said chamber 31 at equal angular spacings from each other. The distribution chamber 31 is connected with the feed passage 19 by a plurality of branch orifices 33 which extend through the side wall of the die holder 11. Along the mating contact surfaces of the inner rotary member 12 and the outer rotary member 13, there is provided an annular orifice 34 which is jointly formed by said two rotary members. The annular orifice 34 is connected to all of the distribution channels 32.

Figure 6:
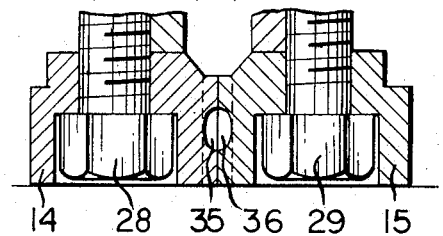
FIG. 6 is an enlarged view of a fragment of FIG. 4.
Figure 7:
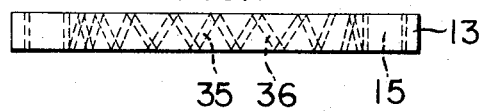
FIG. 7 is a schematic side view showing positions of the intersected slots of the annular die members.
Figure 8:
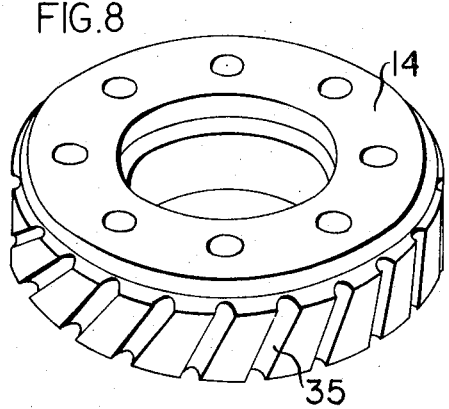
FIG. 8 is a perspective view of the inner die member.

As will be apparent from FIGS. 8 and 9, the inner die member 14 and the outer die member 15 are each ring-shaped and they are so designed that the inner die member 14 neatly fits within the central opening of the die member 15. The inner die member 14 is provided with a plurality of slanted slots 35 which are disposed at equal intervals along the outer circumferential surface thereof. The outer die member 15 is provided with a plurality of slanted slots 36 disposed at equal intervals along the inner circumferential surface thereof. The slots 36 are slanted in the direction opposite to the slanting of the slots 35. Moreover, the relative positions of these slots 35 and 36 are arranged so that each slot 35 continuously intersects at least one of the slots 36 within the contact zone between the inner die member 14 and the outer die member 15. FIGS. 5–7 show examples of the relative positions of the slots 35 and 36. That is, FIG. 6 shows the die arranged so that the slots 35 and 36 intersect at about the middle of the length of the contact zone of the die members 14 and 15, and FIG. 7 shows the dies arranged so that the slots 35 and 36 intersect at two points, such as at the inlet and outlet thereof.

The slots 35 and 36 are required to be provided in such an arrangement that the position where the slots 35 and 36 intersect will shift, by virtue of the relative rotation between the inner die member 14 and the outer die member 15 in the direction of flow of the extruded material from the die along the locus of the slot. This is because of the fact that, if the intersection position were to shift in a direction opposite to the direction of flow of the extruded material from the dies along the locus of the slot, the molten resin could not be extruded from the die. Thus, for the reasons stated above, in case the slots 35 and 36 are provided slanting in the directions shown in FIGS. 8 and 9, the direction of rotation of the inner die member 14 with respect to the outer die member 15 must be in the direction indicated with the arrow in FIG. 5. Accordingly, in case the directions of slant of the slots 35 and 36 are respectively opposite to those illustrated, the directions of relative rotation between the inner die member 14 and the outer die member 15 should be respectively opposite to the direction indicated by said arrows.

In operation, the molten resin is extruded from the extruder 7 and is forced into the feed conduit 19. The molten resin subsequently flows into the distribution chamber 31 by way of the branch orifices 33 and flows therefrom into the annular orifice 34 via the distribution channels 32. The molten resin is then fed into the interstices between the inner die member 14 and the outer die member 15, which are rotating relative to each other, so that the resin flows out of the die assembly so as to form a tubular net 37. Because the die members 14 and 15 are relatively rotating with respect to each other, the molten resin is caused to form reticular intersections at the points where the slots 35 and 36 cross with one another and the extruded product is fed out continuously as an integral tubular net.

The tubular net 37 as extruded from the die assembly 6 includes a first plurality of outer elongated strands 38 which are disposed in substantially parallel relationship and are wound in a helical pattern. The strands 38 are extruded through the slots 36 formed in the outer die member 15. The tubular net 37 also includes a further series of inner elongated strands 39 which are also substantially parallel to one another and extend in a substantial helical pattern which is wound in the opposite direction from the helical pattern of the strands 38. The strands 39 are extruded through the slots 35 formed in the inner die member 14 so that the strands 39 are disposed directly adjacent and within the outer strands 38. Further, due to the intersection between the slots 35 and 36, the outer and inner strands 38 and 39, respectively, intersect one another with the strands being in contact and substantially integrally bonded together at said points of contact. The resulting foamed tubular mesh 37 thus comprises inner and outer tubular layers each of which includes a plurality of elongated helical strands, with the individual strands of the inner layer being wound in the opposite direction from the individual strands of the outer layer, and with the individual strands of the inner and outer layers being integrally connected at their points of intersection. As previously noted, in section B the strands 38 and 39 are more closely spaced and have a shorter pitch, than in section A.

According to the present apparatuses, by appropriately determining the rate of rotation of the motor as well as the variable speed gear mechanism and the combination of various gears and electromagnetic clutches, the r.p.m. of the die assembly can be changed at will, and the duration of the low-speed operation and high-speed operation can be controlled as desired by means of the time setting of the timer which controls the electromagnetic clutches, so that it is possible to continuously produce a foamed tubular net having desired network patterns and different diameters. Particularly in case of the apparatus shown in FIG. 2, since the variable speed gear mechanism is capable of controlling only the high speed driving, it is feasible to effect a delicate adjustment of the diameter as well as the network pattern of the tubular net extruded at the time of high-speed driving. Further, this speed variation is possible during the operation of the apparatus, so that the switchover of one type of product to another can be easily performed.

Inasmuch as the foamed plastic tubular net resulting from the present invention is capable of expansion and contraction in the crosswise direction, it can be cut into pieces or segments of an appropriate length and utilized as a protective sleeve or cover to cover glassware, ceramic ware and various precision apparatuses of tubular shape. When cup-shaped pieces are obtained by cutting said tubular net in the middle of the portion A with the large diameter and at the neighboring portion B with the small diameter or when double-cup shaped pieces are prepared by cutting the tubular net in the middle of the adjacent portions A of large diameter and turning one half of each piece inside out in the middle of the portion with the small diameter, they can be effectively utilized as shock-proof packing sleeves or covers for globular fruits such as apples, pears, peaches, etc.

FIGS. 10–15 illustrate various ways in which the foamed tubular net 37 constructed according to the present invention can be utilized as shock-proof packing covers or sleeves to protect delicate fruits or articles.

Figure 10:
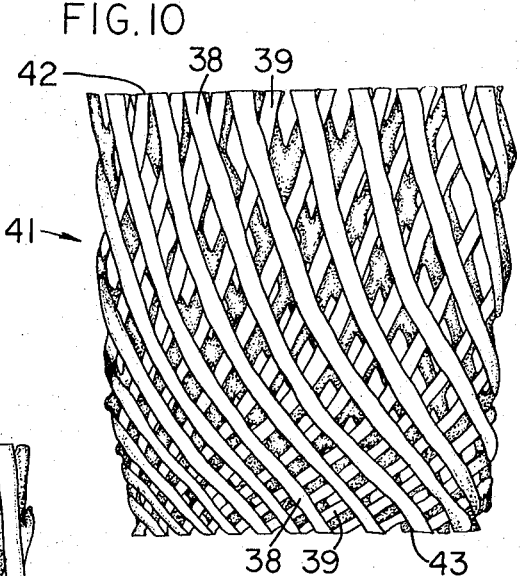
FIGS. 10–12 are front views of three different types of protective sleeves or covers which can be constructed from the tubular net illustrated in FIG. 3. Portions of FIGS. 11 and 12 are broken away.

FIG. 10 illustrates a sleeve 41 which is formed by cutting the tubular mesh 37 substantially at the mid-point of the reduced diameter section B, such as by cutting same along the plane X—X, and by also cutting the tubular mesh substantially at the mid-point of the adjacent enlarged diameter section A, such as along the plane Y—Y. The resultant sleeve 41 which is formed by cutting the tubular mesh 37 along the planes X—X and Y—Y has one end thereof, such as the upper end 42, of substantially larger diameter than the lower end 43. Further, the spacing or pattern of the network at the end 42 is obviously different from the spacing or network adjacent the lower end 43. The sleeve 41 includes an outer layer of strand segments 38 which are disposed directly over an inner annular layer of strand segments 39, which strand segments 38 and 39 are integrally interconnected at their points of intersection. The strand segments 38 and 39 are helically wound in opposite directions, and the opposite axial ends of the strand segments 38 and 39 terminate adjacent the opposite ends 42 and 43 due to the cutting or severing operation as performed in the planes X—X and Y—Y.

The sleeve 41 thus has a flared or cup-shaped configuration since the one end 43 is of substantially smaller diameter than the other end 42.

Figure 11:
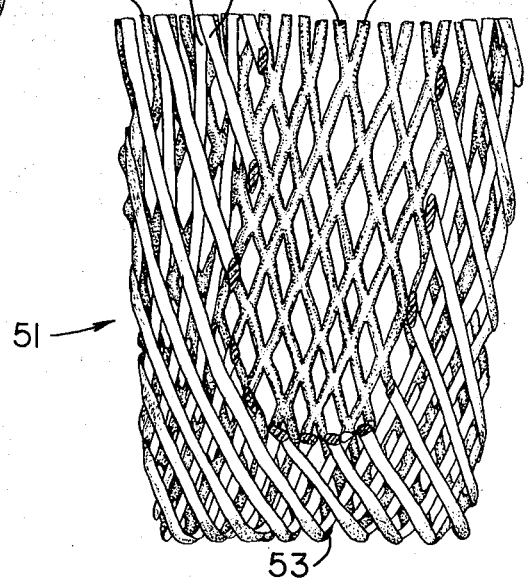

FIG. 11 illustrates therein a further sleeve structure 51 which is similar to the sleeve 41 but has a double-cup configuration, that is, the sleeve 51 is formed by two overlapping layers of tubular net. To form the sleeve 51, a segment of tubular net is first cut from the elongated tubular net 37, such as by cutting same substantially at the mid-points of adjacent enlarged diameter portions, such as along the planes W—W and Y—Y as illustrated in FIG. 3. This thus results in a tubular segment having enlarged diameter portions adjacent opposite ends thereof, with the center of the segment having a reduced diameter portion. One half of the resulting tubular segment is then turned inside out so as to surround and overlie the remaining half of the tubular segment, thereby resulting in formation of the sleeve 51 as illustrated in FIG. 11. The enlarged diameter ends of the tubular segment, which originally constituted a part of the enlarge portions A, are thus disposed in surrounding relationship to one another and thus result in the sleeve 51 having an enlarged diameter at one end thereof, such as at the upper end 52. The other or lower end 53 of the sleeve 51 is consequently formed by the reduced diameter portion B, and thus the lower end 53 of the sleeve 51 has a diameter substantially less than the diameter of the end 52. The sleeve 51 thus includes an outer tubular net portion which has oppositely directed and integrally connected helical strands 38 and 39 disposed closely adjacent and in surrounding relationship to an inner tubular net portion which also has oppositely directed and integrally connected helical strands 38' and 39', which strands constitute an integral extension of the strands 38 and 39, respectively. All of the cut or severed ends of the strands are disposed at the end 52, whereas the end 53 is formed by the strands being bent back upon themselves so as to extend substantially in the opposite axial direction. The sleeve 51, like the sleeve 41, also has a substantially cup-shaped configuration since the lower end 53 is formed by the reduced diameter portion B of the tubular net, whereas the upper end 52 is formed by the larger diameter portion A.

Figure 12:
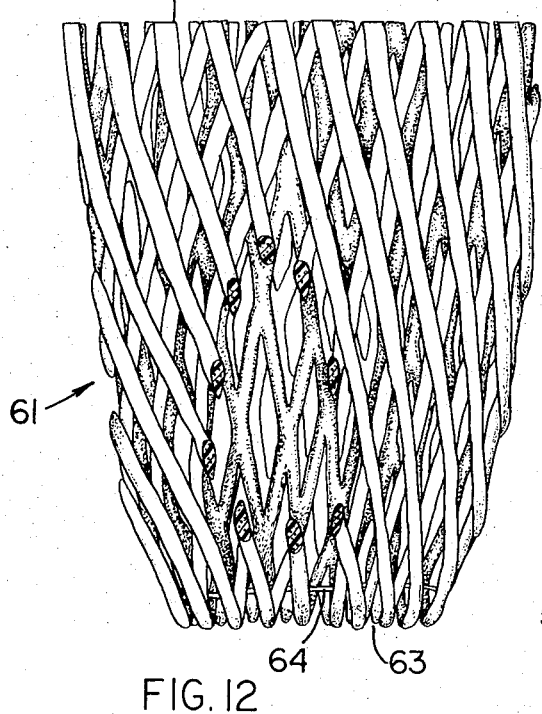

A further modification is illustrated in FIG. 12 which discloses a sleeve 61 which has one end 62 thereof of substantially larger diameter than the other end 63 so as to have a substantially cup-shaped configuration. The sleeve 61, like the sleeve 51, is also formed from an elongated net segment which is approximately twice the length of the sleeve 61, with one half of the net segment being turned inside out so as to be disposed in surrounding relationship to the other half of the net segment. However, in constructing the sleeve 61, the net segment is originally of a constant diameter, such as by being cut entirely from the enlarged diameter portion A. However, prior to turning and overlapping the net segment, an endless resilient element 64, such as a rubber band, is disposed in surrounding relationship to the net segment at approximately the mid-point thereof, whereupon one half of the net segment is then turned inside out over the other half of the net segment, thereby leaving the resilient element 64 disposed between the inner and outer layers of the tubular net substantially adjacent the end 63 thereof. The resilient element 64 causes a partial contraction of the folded end 63 so that said folded end thus has a diameter less than the diameter of the free end 62. The sleeve 61, by use of the resilient element 64, thus asumes a cup-shaped configuration substantially similar to the sleeve 51, even though the sleeve 61 is initially manufactured from a tubular net segment having a substantially constant diameter.

Figure 14:
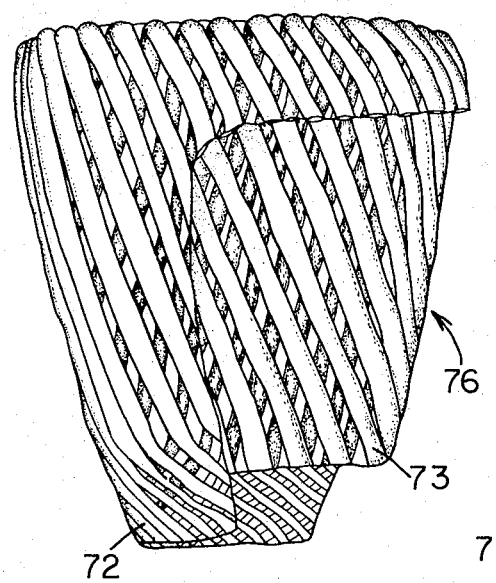
FIGS. 14–15 are partially broken away front views of two further tubular covers or sleeves which are formed from the net segment illustrated in FIG. 13.
Figure 15:
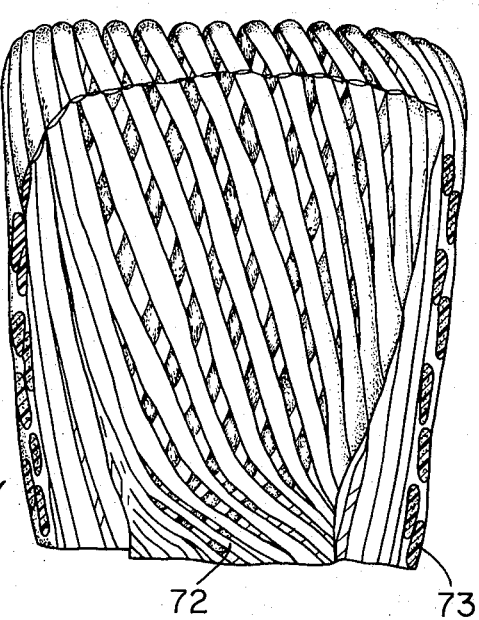
Figure 13:
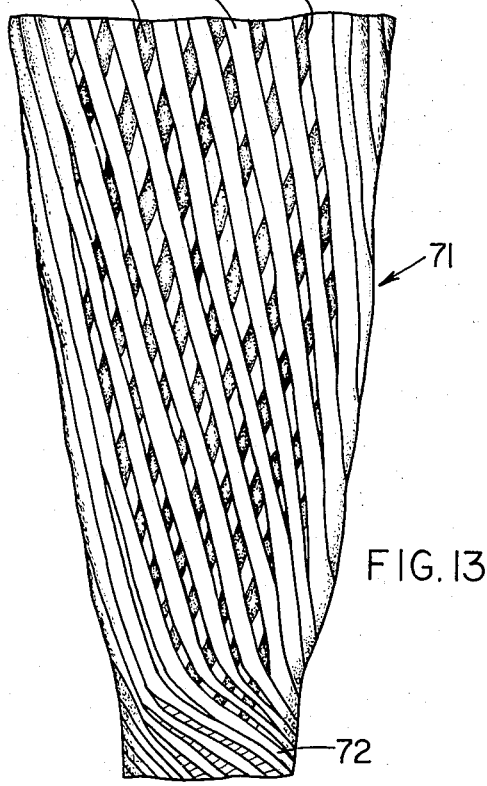
FIG. 13 is a front view of a portion of a tubular net segment constructed according to the present invention.

FIGS. 14 and 15 illustrate therein still further sleeves or covers which can be constructed from a tubular net segment, such as the segment 71 illustrated in FIG. 13.

The segment 71 can be cut from a tubular net similar to the net 37 illustrated in FIG. 3, such as by cutting the net 37 along the planes X—X and Y—Y, whereupon the resulting tubular net segment 71 thus has one end portion 72 which is substantially smaller in diameter than the other end portion 73. Further, the tubular net segment 71 again has two strand layers, namely an outer layer of helical strands 38 and an inner layer of helical strands 39 which are integrally connected to the outer strands 38 at their points of intersection.

The tubular segment 71 illustrated in FIG. 13 can be readily formed into the sleeve 76 illustrated in FIG. 14 merely by turning approximately one half (the upper half in FIG. 13) of the net segment 71 inwardly so that the other half (the lower half in FIG. 13) of the net segment 71 is thus disposed in surrounding relationship thereto. This thus results in the opposite end portions 72 and 73 being disposed closely adjacent one another, with the small diameter end portion 72 being disposed externally of the larger diameter portion 73. When the larger diameter portion 73 is turned inwardly into the smaller diameter portion of the net segment, the free end of the larger diameter portion 73 is preferably stopped short of the free end of the small diameter portion 72 (as illustrated in FIG. 14), whereupon the small diameter portion 72 thus causes the free end of the large diameter portion 73 to be bunched together and results in formation of a sleeve which has good buffering or shock absorbing characteristics.

The sleeve 78 illustrated in FIG. 15 is also formed from the net segment 71 illustrated in 13. However, the sleeve 78 is formed by turning the larger diameter half of the segment 71 outwardly, that is inside out, so that the larger diameter portion 72 will thus overlie the other half, namely the smaller diameter portion 71. This thus results in the free end of the larger diameter portion 73 being disposed directly adjacent and in surrounding relationship to the free end of the smaller diameter portion 72, as illustrated in FIG. 15.

The sleeves 76 and 78, as illustrated in FIGS. 14 and 15, respectively, thus resemble the sleeves 51 and 61 since they are all formed by causing one half of a tubular net segment to be turned so as to overlap the other half of the tubular net segment, whereas the resulting sleeve has an axial length approximately one half the initial length of the net segment. Further, the resulting sleeve is formed by two superimposed layers of foamed tubular net, each of which includes two sublayers of helical strands extending in opposite directions. A sleeve or cover constructed in this manner is highly desirable since it doubles the thickness of the foam material, thereby substantially increasing the shock absorbing characteristics of the sleeve and thereby making its use highly desirable for protecting delicate fruits and objects during shipping and packing. The sleeves illustrated in FIGS. 14 and 15 differ from the sleeves of FIGS. 10–12 because their upper ends are rounded, which facilitates insertion of objects therein. The embodiment of FIG. 15 has the further advantage that the depending outer skirt improves the stabilization thereof.

Further, the present apparatuses (FIGS. 1 and 2) can also be employed in manufacturing non-foamable plastic tubular nets in the same way as above, not to mention foamed tubular nets consisting of such thermoplastics as polyethylene, polystyrene, polypropylene, etc., which are provided with portions having a different network and diameter and formed at regular intervals along the lengthwise direction of the tubular net.

The following is an example embodying the present invention, but the scope of the present invention is not limited thereto.

EXAMPLE

In the operation of an apparatus shown in FIG. 1, a 5 H.P. motor (31–125 r.p.m.) was employed as the motor with a non-step speed change gear, and the rate of the low speed and the high speed was lowered to 1:9 by means of the variable speed gear mechanism. By the use of a 44 tooth by 66 tooth gear ratio on the low-speed side and a 66 tooth by 44 tooth gear ratio on the high-speed side, the rotation of the die was adjusted to be 42 r.p.m. at the time of high speed, and the intervals of the change of speed of the die were adjusted to be 1.3 seconds for the low speed and 0.3 second for the high speed. Under the foregoing conditions, foamable molten polyethylene resin was extruded from the die at the rate of 12 l./minute, whereby there was obtained a continuous tubular net consisting of foamed polyethylene and provided with portions having a different diameter as well as network patterns at regular intervals. The wide diameter portion A of this tubular net resulting from the low-speed extrusion was 80 mm. in diameter, 190 mm. in length, and the number of meshes lengthwise was 6, while the narrow diameter portion B thereof resulting from the high-speed extrusion was 55 mm. in diameter, 50 mm. in length, and the number of meshes lengthwise was 4, each mesh being smaller in size than that of the portion A.

The embodiments of the invention in which an exclusive property or privilege is claimed are defined as follows:

1. A method of manufacturing a foamed plastic tubular net which comprises extruding streams of a foamable molten plastic material from an annular rotary head die which includes a pair of members which rotate relative to each other in a direction transverse to the direction of extrusion so that the streams intersect each other and join together at the intersections thereof, continually changing the speed of the rotation of said members at regular time intervals to provide intervals of low relative speed rotation and intervals of high relative speed rotation to thereby extrude a tubular net provided with portions having different network patterns as well as different net diameters at regular intervals along the lengthwise direction of said net.

2. A method according to claim 1, in which the die members are continuously rotated in opposite directions with the ratio of the revolution rates of the die members being constant during both low speed operation and high speed operation, the die members having oppositely inclined elongated grooves having open sides which confront each other with the grooves being arranged so that each of the grooves in one die member intersects at least one groove in the other die member, the extruding step including flowing foamable molten plastic material into the grooves to form said plastic material into strands and uniting the strands within the die at the intersections of said grooves so that the strands issue from the die as continuous helices with the helices formed by one die member being coiled in the opposite circumferential direction in relation to the helices formed by the other die member and with the helices being united to each other where they cross and the helices formed during high speed operation being more closely spaced and having a shorter pitch than the helices formed during low speed operation, solidifying the plastic material after it issues from the die and permitting the plastic material to shrink as it solidifies so that the diameter of the net formed during high speed operation is less than the diameter of the net formed during low speed operation.

3. A method of manufacturing a foamed plastic tubular net by extruding a foamable molten plastic material from an annular rotary head die which includes a pair of die members which are rotatable relative to each other in a direction transverse to the direction of extrusion, comprising the steps of:

continuously rotating said pair of die members relative to one another;

continuously supplying molten plastic material to said relatively rotating die members for extruding therefrom an elongated and continuous tubular mesh;

rotating said die members relative to one another at at first relative speed for a predetermined time for forming a determined length of tubular mesh of a first diameter;

rapidly changing the relative speed of said die members for causing said die members to rotate at a second relative speed which is substantially greater than said first relative speed;

rotating said die members relative to one another at said second relative speed for a predetermined time for forming a determined length of tubular mesh of a second diameter, said second diameter being substantially smaller than said first diameter; and repetitively and regularly varying the relative speed of said die members between said first and second relative speeds for producing an elongated and continuous tubular mesh having alternating portions of said first and second diameters disposed at regular intervals along the lengthwise direction of the mesh.

References Cited
UNITED STATES PATENTS

| | | | |
|---|---|---|---|
| 3,228,063 | 1/1966 | Gutierrez | 156—244 X |
| 3,308,220 | 3/1967 | Smith | 156—244 X |

WILLIAM A. POWELL, Primary Examiner

U.S. Cl. X.R.

156—167, 180, 296, 441, 500; 161—58, 139, 140, 166; 264—167, 176, 310; 425—133